United States Patent [19]

Wenger et al.

[11] 4,099,455
[45] Jul. 11, 1978

[54] DOUBLE-EXTRUSION APPARATUS FOR PRODUCING DENSE, UNIFORMLY LAYERED VEGETABLE PROTEIN MEAT ANALOGUE

[75] Inventors: La Von Gene Wenger, Sabetha; Elmer John Osterhaus, Seneca, both of Kans.

[73] Assignee: Wenger Manufacturing, Sabetha, Kans.

[21] Appl. No.: 691,635

[22] Filed: Jun. 1, 1976

Related U.S. Application Data

[62] Division of Ser. No. 581,111, May 27, 1975, Pat. No. 3,970,761.

[51] Int. Cl.$^2$ ............................ A23J 3/00; A23P 1/00; B29C 9/00; B29F 3/08
[52] U.S. Cl. ......................................... 99/450.1; 99/483; 425/131.1; 426/802
[58] Field of Search .................... 49/450.1, 483, 467; 426/404, 104, 802, 506; 259/5–8, 192–193; 425/131.1, 467, 380

[56] References Cited

U.S. PATENT DOCUMENTS

| | | | |
|---|---|---|---|
| 3,498,793 | 3/1970 | Page | 426/802 |
| 3,664,790 | 5/1972 | Hollander | 425/131.1 |
| 3,939,284 | 2/1976 | Akin | 426/802 |
| 3,940,220 | 2/1967 | D'Arcangeli | 425/131.1 |

*Primary Examiner*—Harvey C. Hornsby
*Assistant Examiner*—Robert Pous
*Attorney, Agent, or Firm*—Schmidt, Johnson, Hovey & Williams

[57] ABSTRACT

Apparatus for performing a processing method which preferably includes extruding a vegetable protein-water mixture in a first extrusion cooker under conditions to render the mixture hot and flowable but still substantially unoriented, whereupon the mixture is passed through a second extrusion cooker which is equipped with a hollow tubular spacer on the extrusion end thereof. In this manner the mixture is subjected to further axial and transverse displacement forces in the second extruder barrel in order to adequately work and stretch the protein therein while being subjected primarily to axially directed displacement forces in the elongated die spacer for facilitating the formation of a layered meat-like structure therein prior to extrusion; in addition, conditions of temperature and pressure are controlled so that the resultant product is relatively dense and unexpanded. In other forms, the density, chewiness and other properties of the analogue products hereof can be selectively altered by the addition of coloring agents, pH modifiers or other ingredients, or by varying the process conditions.

6 Claims, 23 Drawing Figures

DOUBLE-EXTRUSION APPARATUS FOR PRODUCING DENSE, UNIFORMLY LAYERED VEGETABLE PROTEIN MEAT ANALOGUE

This is a division of application Ser. No. 581,111, filed on May 27, 1975 now U.S. Pat. No. 3,970,761.

The present invention relates to vegetable protein-based, extrusion processed full meat substitutes which have meat-like appearance, taste and organoleptic properties which make the products especially adapted for use in foods such as soups, curries, stews, pot pies, casseroles, dry soup mixes, sauces, oriental dishes, canned foods, or as fried, broiled or breaded bite-sized chunks. These products also may be rehydrated and thereafter frozen or incorporated into packaged foods to be frozen or canned foods. More particularly, it is concerned with layered, substantially untwisted meat products made from a vegetable protein such as defatted soy flour and water in a manner to create the layered meat-like structure and under conditions minimizing the extent of expansion which takes place upon extrusion of the product.

As the world's population increases, the need for greater quantities of edible protein is becoming more important as a basic nutritional requirement. As a consequence, there has been an increasing tendency to utilize vegetable sources of protein for human consumption as opposed to meat proteins and the like. This stems from the fact that equivalent amounts of protein in vegetable form go considerably farther when consumed directly than when fed to animals. For example, a steer generally consumes 7 pounds of high protein feed for every pound of meat produced, which is obviously an inefficient conversion ratio. For these reasons then, a significant amount of work is being done today in developing economical, commercially feasible methods for processing vegetable protein sources such as soybeans into attractive forms for human consumption.

In this connection, many workers in the art have been attempting to develop processes for producing suitable meat substitutes from vegetable protein sources. In many cases, it has been found advantageous to extrusion cook defatted soy flour or other vegetable proteins in order to texturize and orient the vegetable protein and produce meat extenders for use with hamburger or like products. Exemplary processes of this type are taught in U.S. Pat. Nos. 3,047,395; 3,142,571; 3,488,770 and 3,870,805. Although these extrusion processes have met with a certain degree of acceptance in the art, the meat substitute products heretofore produced have possessed several inherent characteristics which have seriously limited their use, especially as full substitutes for meat. One of the most persistant objections to those prior products stems from the expanded, cellular, spongy nature thereof. In particular, most of these meat extenders are produced under high pressure and temperature conditions in the extrusion cooker which results in a twisted, randomly oriented meat extender, which after rehydration is characterized by a chewy structure of twisted layers, but which lacks the appearance, mouth feel or range of utility of meat. This of course has for the most part limited the use of these products to the role of meat extenders in ground hamburger type meats and the like. Moreover, if too much of the prior vegetable protein product is employed in such hamburger-type meats, the extended meat becomes unacceptably spongy and exhibits a random, unappealing appearance and mouth feel.

Furthermore, because of the twisted, cellular nature of most prior extruded products, it has been the general practice to finally comminute the same as opposed to using these products in chunks or the like as full meat substitutes. As can be appreciated, acceptable chunk products would have particular utility in stews, sukiyaki and like products whereas conventional comminuted vegetable protein products find little if any utility in such foods. However, commercial requirements dictate that any chunk-size vegetable protein meat analogues possess textural properties closely similar to those of real meat since such chunks would not be intimately admixed with real meat as in the case of extended products and thus any objectionable properties thereof would be more pronounced and noticeable.

Other processes for the production of vegetable protein based meat analogues have also been proposed, but these likewise have met with a number of heretofore unresolved problems. For example, so-called "spun filament" processes are presently in use wherein very thin strands or filaments of isolated protein are prepared in a spinnerette and the resulting filaments are recovered and stretched, impregnated with fat, egg proteins and cereal binders, colored, flavored and bound together under pressure to produce full meat analogues. While such spun products are in general superior as full meat analogues to conventional extrusion processed meat extenders, the high cost and complexity of this type of process in many cases eliminates the major advantage gained through the use of vegetable protein meat analogues, i.e., utilization of a low cost protein source as opposed to more expensive meat.

It is therefore the most important object of the present invention to provide an extrusion processed, vegetable protein-based meat analogue which has a dense, relatively uniformly layered, untwisted structure and exhibits mouth-feel, appearance and organoleptic properties which closely simulate those of real meat to permit use of the analogues in comminuted, chunk or bite size form as a substitute for a wide variety of meats such as beef, pork, fish and poultry.

As a corollary to the foregoing, it is also an aim of the invention to provide a method and apparatus for low cost, extrusion processing of vegetable protein products into full meat analogues exhibiting the desirable textural and appearance properties alluded to above, so that the products hereof can be produced relatively inexpensively without the necessity of employing spinnerettes or other complex equipment and procedures, and without the use of relatively expensive ingredients.

A still further object of the invention is to provide an extrusion cooking process for the production of layered, untwisted meat analogues wherein an admixture of a vegetable protein and moisture is heated and agitated to render the same hot, flowable and substantially unoriented, whereupon the admixture is passed through an extrusion cooker having a tubular extension on the extrusion end thereof which defines an elongated processing area serving to facilitate the formation of layers in the product prior to extrusion thereof. During processing, the admixture in the extruder barrel is subjected to displacement forces both in an axial and transverse direction relative to the barrel in order to work and stretch the vegetable protein, while in the tubular extension the admixture experiences primarily axially directed displacement forces for enhancing the buildup of the layered, dense meat-like structure of the meat analogue; in addition, processing conditions such as pressure and temperature within final sections of the extruder barrel and extension are maintained at levels such that the products emerge therefrom in relatively dense and unexpanded form and with little visible flashoff of steam.

Yet another object of the invention is to provide a method and apparatus for the production of meat analogues wherein a first extrusion cooker is provided for heating, denaturing and thoroughly mixing the vegetable protein-water admixture without substantial texturization or orientation of the protein therein, with a separate, adjacent, second extrusion cooker also being provided to receive the pretreated, unoriented protein mixture and form the same into the dense, layered, untwisted meat-like products of the present invention; the second extruder is of the type including an extension on the extrusion end thereof presenting an elongated processing area for permitting the buildup of the layered meat-like structure of the meat analogue products, with conditions being maintained in the second extruder so that the extruded products remain dense and relatively unexpanded.

In the drawings:

FIG. 3 is an enlarged, fragmentary view in vertical section illustrating the extrusion end of the secondary extrusion cooker in the apparatus depicted in FIGS. 1 and 2;

Figure 1:
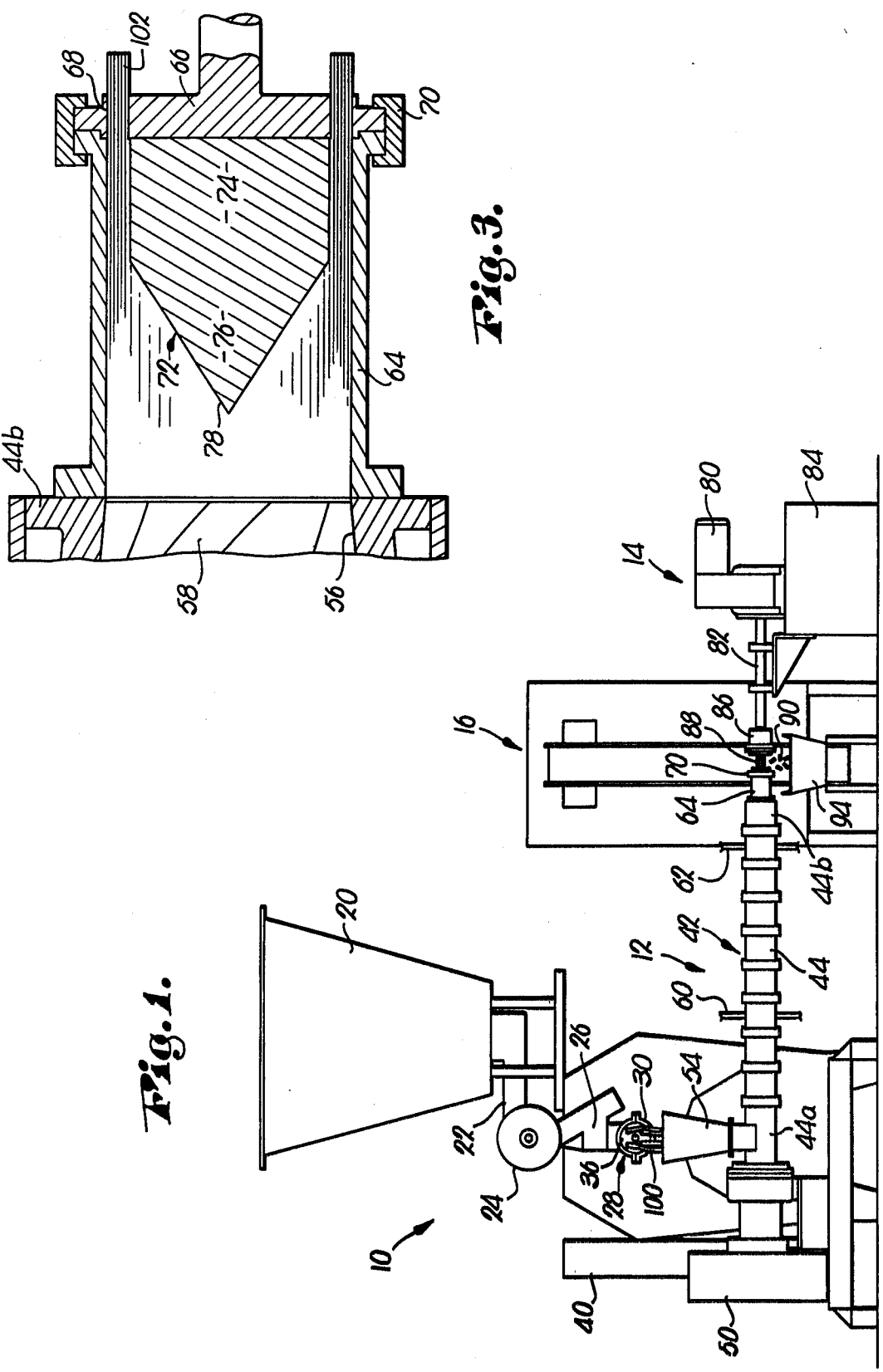
FIG. 1 is a side elevational view of the double extrusion apparatus used in the production of the meat analogue products of the present invention.
Figure 2:
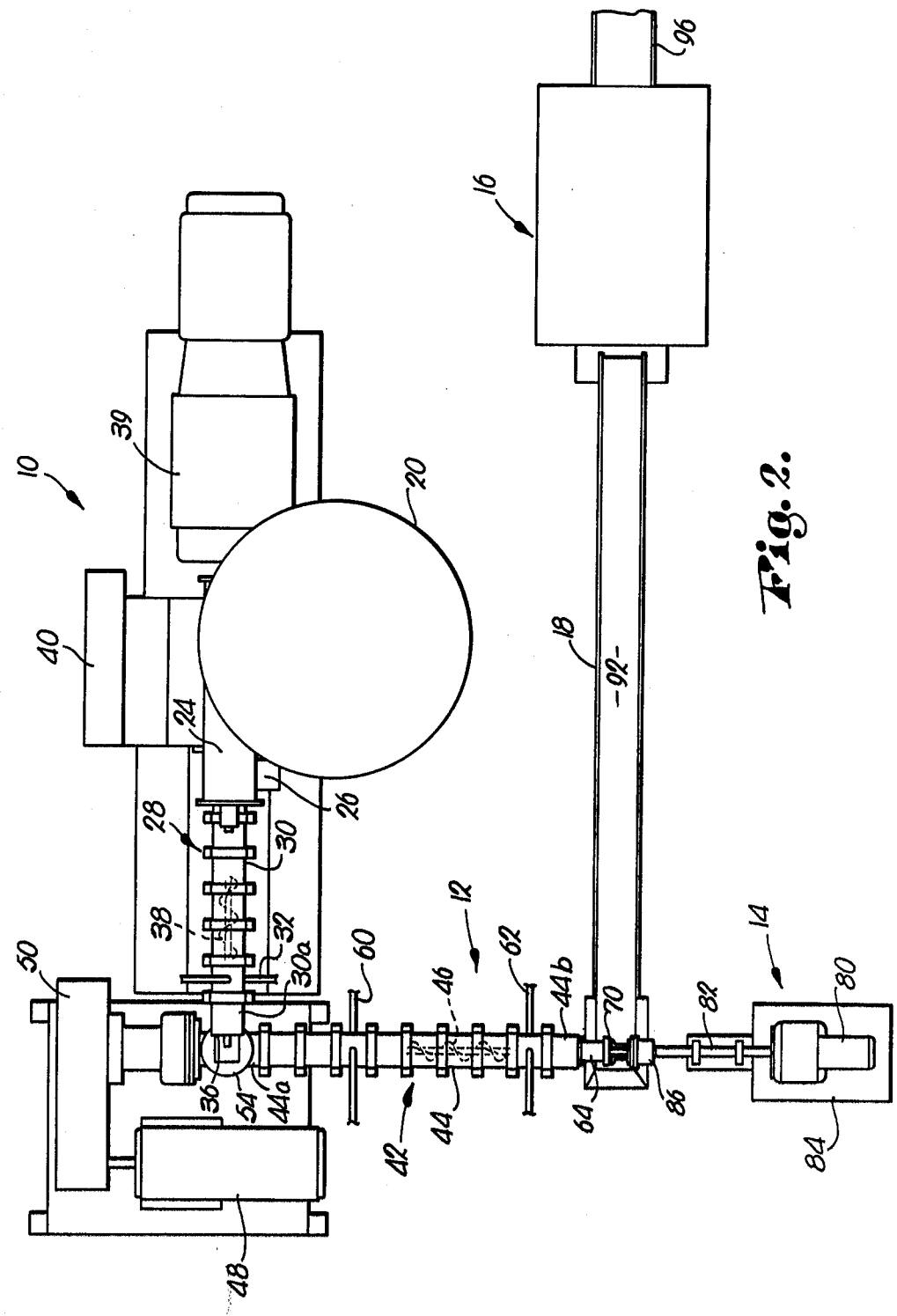
FIG. 2 is a top plan view of the apparatus illustrated in FIG. 1.

The preferred double extrusion apparatus for use in the present invention is illustrated in FIGS. 1 and 2. Broadly, this apparatus includes a first extruder 10, an adjacent secondary extruder 12, a rotary cutting knife assembly 14 and a conventional product dryer/cooler 16. As best illustrated in FIG. 2, second extruder 12 is positioned adjacent the delivery end of first extruder 10 and in general perpendicular relationship thereto. In addition, a conveyor 18 is provided for delivery of the meat analogue product emerging from second extruder 12 to dryer/cooler 16.

In more detail, primary extruder 10 illustrated in the drawings is a Wenger model X-25 extrusion cooker which includes an upright, open-top frustoconical material hopper 20 which is situated above the main body of the extruder for receiving dry ingredients to be processed. An outlet pipe 22 extends from the bottom of hopper 20 to an elongated high speed mixing cylinder 24. Steam and water lines (not shown) are attached to cylinder 24 for the purpose of selectively conveying measured quantities of moisture thereto for intimate admixing with and increasing the temperature of the dry ingredients from hopper 20. Conveying structure 26 is connected to the bottom of cylinder 24 and extends between the latter and an elongated, multi-head extrusion barrel generally designated by the numeral 28. In this instance, barrel 28 is composed of seven axially aligned, interconnected tubular heads 30 of equal diameter which have individual surrounding jackets for the introduction of heating or cooling media such as steam or cold water as needed in order to control the temperature of the admixture passing through the respective segments of barrel 28. For this purpose, each head is provided with fluid delivery and discharge lines illustrated schematically as at 32. In addition, a steam and/or water inlet is provided with barrel 28 so that moisture can be directly added as desired to the admixture flowing therethrough.

The seventh and final head 30a of barrel 28 terminates in a die plate 36 having a series of die orifices therethrough (see FIG. 1) so that product introduced into the rearward end of barrel 28 can be extruded out the forward end thereof in an axial direction relative to the barrel. In this instance, 4 equidistantly spaced and circularly arranged die openings are provided, but of course extrusion dies of other configurations could also be used.

An elongated, multi-flight helical auger screw 38 is positioned within barrel 28 for the purpose of moving product through the barrel under conditions of high mechanical shear, agitation and pressure. In this case, auger 38 is made up of a number of axially interconnected sections which cooperatively extend substantially the entire length of segmented barrel 28. Motive power for extruder 10 is provided through the use of a large electric motor assembly 39 which is coupled through conventional means to auger 38 within barrel 28 in order to effect axial rotation of the latter at desired rotational speeds. In this regard, a control console 40 is provided for the purpose for selectively controlling and adjusting the operational parameters of extruder 10, including rotational speed of auger 38 as well as moisture delivered to mixing cylinder 24 and extruder barrel 28 and the type and amount of heat exchange media fed to the individual surrounding jackets in barrel 28.

Second extruder 12 is similar in many respects to extruder 10, and includes an elongated multisection barrel 42 made up in this case of ten axially aligned, interconnected tubular heads 44 which likewise are individually jacketed (see FIG. 3) for the introduction of heat exchange media such as steam or cold water. In addition, a multisection auger screw 46 is situated within barrel 42 and is driven by conventional electric motor 48 and transmission structure 50. Rearmost head 44a includes an upstanding product hopper 54 which serves to deliver the pretreated product from extruder 10 to the interior of barrel 42. The first nine heads of barrel 42 are of constant diameter and are provided with axially aligned, circumferentially spaced, rectilinear rifling ribs along the internal surfaces thereof. However, the interior of terminal head 44b of barrel 42 is slightly tapered as illustrated at 56 in FIG. 3, and this head houses a similarly configured, conical auger screw 58 which is coupled with the remaining sections of auger screw housed within the first nine barrel sections. Of course, the specific configuration of the barrel sections is not critical of the invention, e.g., spiralled ribs or a cylindrically configured final head could be employed. As is the case with extruder 10, each head 44 of segmented barrel 42 includes fluid conduits schematically illustrated as at 60 and 62 for the delivery and return of heat exchange media such as water or steam to the respective heads.

The extrusion end of barrel 42 includes an elongated, axially aligned, hollow tubular extension 64 which is in communication with the remainder of the extruder barrel through the forward opening of head 44b. In this case extension 64 is 6 inches in length and has an inside diameter of 4.365 inches giving a length-to-diameter ratio of about 1.37. Referring specifically to FIG. 3, it will be seen that extension 64 is attached to the extreme end of head section 54 with the respective openings of the head and section being aligned so that product from barrel 42 can pass into tubular section 64 without substantial restriction. The end of section 64 remote from head 54 is covered by a die plate 66 having a total of 24, ⅜ inch square, circumferentially arranged, peripheral die openings 68 therein. A circumferential retaining ring 70 is employed for removably securing plate 66 onto the end of extension 64. In addition, flow directing means in the form of unitary bullet structure 72 is attached to the inner face of die plate 66 for the purpose of directing the flow of material entering section 64 toward the peripheral die openings. In this respect, structure 72 includes a cylindrical section 74 attached to plate 66 and extending rearwardly therefrom along with an integral, axially aligned conical section 76 likewise extending rearwardly from plate 66 and converging to a terminus 78.

Cutting knife assembly 14 is a conventional unit and includes a drive motor 80 coupled to an elongated, axially rotatable shaft 82 and supported by conventional support structure 84. A cutting head 86 is mounted on the end of shaft 82 remote from motor 80 and includes an elongated knife assembly 88 which is positioned adjacent to the circumferentially arranged die openings 68 provided in plate 66. Assembly 88 is rotated during operation of extruder 12 so that as meat analogue product is extruded from die openings 68, the product is cut into small chunks as shown at 90 in FIG. 1.

Conveyor 18 includes an endless belt 92 and a tapered spout structure 94 at the lowermost end thereof for directing the chunk product onto belt 92. The latter extends upwardly to the top of dryer 16 which is also of conventional nature and serves to remove a large portion of the moisture from the meat analogue product. This product is then passed via delivery spout 96 for collection and packaging.

In its broadest aspects, the method of the present invention involves heating and agitating an admixture of a vegetable protein such as defatted soy flour and moisture (preferably in an extrusion cooker or high-speed mixer) to render the same hot and flowable but substantially untexturized and unoriented. This is followed by moving the admixture under moderate pressure through an elongated processing zone while simultaneously subjecting the same to moderately high levels of shear, compression and mechanical agitation, and to displacement forces both in an axial direction relative to the zone and also transversely thereof. The final step of the method involves moving the admixture into an elongated processing area where the displacement forces acting thereon are primarily in an axial direction in order to build up a layered, meat-like structure in the analogue. In this regard, the temperature and pressure conditions within the zone and area are maintained at levels permitting formation of layers in the admixture as the latter continuously moves through the processing area. The admixture is advantageously extruded from the processing area under a pressure of about 5 to 80 p.s.i.g. (preferably 5 to 65 p.s.i.g.) for minimizing the extent of expansion in the product. In preferred forms, the product is extruded at a temperature of from about 100° F. to 320° F. (most preferably from about 150° to 250° F.) and at a pressure of from about 15 to 45 p.s.i.g.

In more detail, the preferred method of the invention involves preparing an admixture comprising a vegetable protein taken from the group consisting of the proteins of soy, wheat, corn, cottonseed, rapeseed, peanut, sesame, sunflower, mungbean, and mixtures thereof along with moisture (either in the form of steam and/or water) such that the admixture is from about 20 to 55% by weight moisture (most preferably from about 30 to 45% moisture). As used in this instance, the moisture content refers to total moisture present, i.e., native moisture in the vegetable protein source and that added. In this connection, it is especially preferred to employ a member taken from the group consisting of defatted soy flour, soybean meal, wheat gluten, corn gluten, defatted cottonseed flour, vegetable concentrates, vegetable isolates, peanut flour, rape seed flour, sesame flour, sunflower flour, mungbean flour, and mixtures thereof along with moisture to form the admixture.

In any event, the admixture is first moved into and through a first extruder (e.g., extruder 10 in FIGS. 1–2) under conditions of superatmospheric pressure, compression, agitation and shear whereupon the product is extruded in a hot, flowable, substantially unoriented and untexturized condition and at a temperature of from about 100° to 250° F. and a pressure from about 9 to 95 p.s.i.g. (preferably 40 to 80 p.s.i.g.).

Referring specifically to FIGS. 1 and 2 wherein a Wenger Model X-25 extrusion cooker is illustrated as primary extruder 10, it has been found that the first stage treatment of vegetable protein-moisture admixture can be most advantageously accomplished by utilizing an auger rotational speed of from about 150 to 400 r.p.m., and most preferably at about 200 to 350 r.p.m., with the admixture being extruded in an unoriented condition from the first extruder at a pressure level of from about 40 to 80 p.s.i.g. The above temperature and pressure conditions are most advantageously maintained by the selective direction of steam or cooling water to the respective heads of the extruder barrel. In this regard, it has been found most advantageous to extrude the protein-moisture admixture as a hot, flowable, thermoplastic "rope" without cutting or comminuting as best illustrated in FIG. 1 at 100. This assures that the product is thoroughly mixed and also essentially denatured. On the other hand, the product should not exhibit a substantial degree of orientation or texturization as this has been found to inhibit the formation of the layered meat analogues hereof in the secondary extruder.

The second stage of the preferred process involves treating the hot, flowable admixture in a second extruder of the type illustrated in the drawings. Specifically, the admixture is passed through the barrel of such an extruder under superatmospheric pressure and relatively high levels of temperature, compression, agitation, and shear. In the depicted embodiment the auger speed is preferably maintained at a level of from about 100 to 350 r.p.m., and most preferably from about 200 to 300 r.p.m. It will be appreciated that screw speed will vary with different types of extrusion cookers. For example, a large industrial size unit such as a Wenger X-200 machine will normally be operated at screw speeds somewhat less than would be the case with a smaller capacity extruder. The rotation of the central screw serves to work and stretch the vegetable protein and simultaneously subject the admixture to axially and transversely directed displacement forces in the barrel section, and also acts to continuously move the admixture into and through the elongated extension mounted on the delivery end of the barrel. Furthermore, the final extrusion is preferably axial relative to the extruder barrel, although a die having circumferentially disposed orifices could be used in this context. As illustrated in FIG. 3, flow directional means in the form of a bullet or other suitable device is advantageously situated within the extension for the purpose of directing flow of the admixture within the extension towards the die openings. The final steps of the preferred process involve cutting the layered, untwisted analogue into chunks of desired size as it emerges from the second extruder, followed by drying the chunks to remove excess moisture therefrom.

In other forms, it has been found advantageous to let the admixture pass through the atmosphere between the first and second extrusion cookers. In this way any undesirable volatile flavor precursors such as characteristic phenolic acids can be expelled from the admixture, which serves to increase the desirable bland flavor thereof. Furthermore, in some cases it is desirable to color the products hereof during or prior to the production stage, or to add agents for modifying the organoleptic properties of the products. For example, coloring agents, surfactants, emulsifiers, flavoring agents, acids, bases or sulfur compounds such as sodium sulfite, sodium bisulfite, sodium metabisulfite and DL methionine can be added to the initial admixture as desired to alter the appearance, density, mouth feel, rehydration characteristics or other desired characteristics of the final products. Finally, addition of minor amounts of lecithin or other surface active compounds is believed to give the final product a slightly fat-marbled appearance which is advantageous for full meat analogues. In practice, it has been found that the products hereof should have a density prior to drying of from about 20 to 40 lbs./cu.ft., and more preferably from about 25 to 35 lbs./cu.ft.

The following example is set forth as illustrative of the methods of the present invention, but it is to be understood that this example is not meant to in any way limit the scope of the invention.

EXAMPLE

A number of dry mix formulations were prepared in order to determine the types of vegetable protein usable in the invention, as well as the functionality of certain additives in the resultant meat analogue products. These formulations are set forth in Table I hereunder, where all data, unless otherwise indicated, is set forth in terms of percent by weight.

[1]TABLE I

| Mix No. | Defatted Soy Flour | Lecithin | Sodium Metabisulfite | Sodium Bisulfite | Red No. 40 | Red No. 2 | DL-Methionine | Other |
| --- | --- | --- | --- | --- | --- | --- | --- | --- |
| 1 | [2]99.46 | 0.50 | 0.01 | — | 0.025 | 0.005 | — | — |
| 2 | 99.4625 | 0.50 | 0.01 | — | 0.025 | 0.0025 | — | — |
| 3 | 99.4625 | 0.50 | — | 0.01 | 0.025 | 0.0025 | — | — |
| 4 | 99.4575 | 0.50 | — | 0.015 | 0.025 | 0.0025 | — | — |
| 5 | 99.4575 | 0.50 | — | 0.015 | 0.025 | 0.0025 | — | — |
| 5A | 99.4575 | 0.50 | — | 0.015 | 0.025 | 0.0025 | — | 650 ml. Conc. HCl |
| 5B | 99.4575 | 0.50 | — | 0.015 | 0.025 | 0.0025 | — | 0.8 lbs. NaOH |
| 6 | 100.00 | — | — | — | — | — | — | — |
| 7 | 99.00 | — | — | — | — | — | — | 1.00% Full Fat Soy Flour |
| 8 | 99.50 | 0.50 | — | — | — | — | — | — |
| 9 | 99.349 | 0.50 | — | 0.015 | 0.01 | 0.001 | 0.125 | — |
| 10 | — | — | — | — | — | — | — | 100% [3]Soy Concentrate |
| 11 | — | — | — | — | — | — | — | [4]100% Peanut Flour |
| 12 | 99.875 | — | — | — | — | — | 0.125 | — |
| 13 | — | — | — | — | — | — | — | 86.2% Soy Concentrate, 13.8% Water |
| 14 | 86.2 | — | — | — | — | — | — | 13.8% Water |

[1]TABLE I-continued

| Mix No. | Defatted Soy Flour | Lecithin | Sodium Metabisulfite | Sodium Bisulfite | Red No. 40 | Red No. 2 | DL-Methionine | Other |
|---|---|---|---|---|---|---|---|---|
| 15 | | 0.50 | | 0.015 | 0.025 | 0.0025 | — | [5]99.4575 |

[1] All figures given in percent by weight.
[2] Mix Nos. 1-4 made using Central Soya 200W defatted soy flour, lot No. 342, sold by The Central Soya Company of Chicago, Ill.; Mix Nos. 5-8 and made using Central Soya 200W, lot No. 367; Mix Nos. 9, 12 and 15 made using ADM Nutrisoy defatted soy flour sold by The Archer Daniels Midland Company of Minneapolis, Minn.
[3] Mix Nos. 10 and 13 made using Promosoy soy concentrate sold by The Central Soya Company.
[4] Mix No. 10 made using Gold Kist Peanut Flour sold by Gold Kist, Incorporated.
[5] Unground soybean meal sold by The Central Soya Company under the designation Soya Bits White, Lot No. 1471.

Central Soya 200 W, lot No. 342 was analyzed to contain 7.1% moisture, 50% protein, 6.0% fiber, and 0.6% fat. Lot No. 367 contained 6.9% moisture, 50.1% protein, 3.5% fiber and 0.7% fat.

These mixtures (Nos. 1-15) were subjected to the process of the present invention in order to produce meat analogue products. The apparatus employed in most cases was was in all material respects exactly as disclosed in FIGS. 1-3. In most cases water was directed to the jackets around the first and the last three heads of the first extruder, with steam to the jackets of the second, third and fourth heads. However, in Runs Nos. 29 and 30 discussed hereinafter, water was passed around the first head and steam around the remaining six heads, while in Runs 31, 36 and 37 water was passed around all seven heads. Also, steam was directed to the jackets the first nine heads of the second extruder in most cases, with the last head being water cooled. In this regard, in Runs 16 and 20 nothing was passed around the tenth head with the jackets of heads 1-9 carrying steam, while in Run 24 steam was provided to the jackets of all 10 heads. In Run 37 steam was directed to the jackets of the first seven heads and water to the last three, and in Run 38 steam was supplied to jackets of heads 3-7, water to the jackets of heads 1-2 and 9-10 with nothing supplied to the jackets of head 8. Finally, in Run 39 steam was supplied to the jackets of heads 3-7 and water to the remainder, and in Run 44 steam was supplied to the jackets of the first eight heads, and nothing to the jackets of the last two heads. Water and steam was also delivered to the mixing cylinder of the first extruder simultaneously with the introduction of the dry mixtures thereinto in order to form vegetable protein-moisture admixtures. In addition, water was added in most cases to both extruder barrels during passage of the admixtures therethrough.

The extrusion parameters (e.g., screw speeds, pressures, temperatures) were also varied in this series of runs in order to determine what effect if any this had on the ultimate products.

The data collected at the first extruder is set forth in the following Table II:

TABLE II

| | | | | | | First Extruder | | | | | |
|---|---|---|---|---|---|---|---|---|---|---|---|
| Run No. | [1]Mix No. | [2]Water Addition M.C. | [3]Water Addition Extruder | Screw Speed (rpm) | Mixing Cyl. | [4]Temperatures-° F. Head 5 | Head 6 | Head 7 | Extrusion Pressure (psig) | [5]Product Moisture Level | Product Temp ° F |
| 1 | 1 | 52.5 | 109.1 | 300 | 170 | 110 | 75 | 135 | 70 | 33% | — |
| 2 | 1 | 52.5 | 109.1 | 300 | 170 | 90 | 78 | 138 | 75 | — | — |
| 3 | 1 | 52.5 | 109.1 | 300 | 175 | 95 | 80 | 140 | 75 | — | — |
| 4 | 1 | 52.1 | 109.1 | 300 | 175 | 97 | 77 | 142 | 75 | — | — |
| 5 | 1 | 52.1 | 109.1 | 300 | 175 | 112 | 78 | 141 | 75 | — | — |
| 6 | 2 | 52.5 | 109.1 | 300 | 175 | 115 | 75 | 128 | 60 | 39% | — |
| 7 | 2 | 52.5 | 109.1 | 300 | 178 | 119 | 78 | 134 | 60 | — | — |
| 8 | 2 | 52.5 | 109.1 | 300 | 180 | 121 | 82 | 136 | 60 | — | — |
| 9 | 2 | 52.5 | 74.7 | 300 | 180 | 91 | 75 | 139 | 70 | 36% | — |
| 10 | 3 | 56.4 | 109.1 | 300 | 175 | 117 | 77 | 138 | 65 | 38% | — |
| 11 | 3 | 56.7 | 109.1 | 300 | 180 | 122 | 80 | 139 | 65 | — | — |
| 12 | 3 | 56.4 | 109.1 | 300 | 185 | 118 | 78 | 140 | 70 | — | — |
| 13 | 3 | 54.5 | 109.1 | 300 | 185 | 116 | 86 | 136 | 75 | — | — |
| 14 | 4 | 109.1 | 52.5 | 300 | 185 | 134 | 91 | 142 | 55 | 39% | 135 |
| 15 | 4 | 111.0 | 52.5 | 300 | 190 | 112 | 88 | 129 | 50 | — | 145 |
| 16 | 4 | 111.0 | 52.5 | 300 | 190 | 115 | 96 | 127 | 50 | — | 147 |
| 17 | 5 | 74.7 | 50.5 | 300 | 170 | 100 | 70 | 116 | 50 | 41.2 | 136 |
| 18 | 5B | 72.7 | 51.3 | 300 | 180 | 88 | 70 | 132 | 55 | 42.2 | 176 |
| 19 | 5A | 41.4 | 70.6 | 300 | 175 | 87 | 74 | 138 | 60 | 41.0 | 174 |
| 20 | 5A | 51.3 | 76.3 | 300 | 175 | 89 | 75 | 135 | 60 | — | 176 |
| 21 | 6 | 48.8 | 109.1 | 300 | 175 | 87 | 70 | 127 | 50 | 42.0 | 165 |
| 22 | 6 | 48.8 | 58.3 | 300 | 175 | 84 | 74 | 144 | 95 | 36.0 | 174 |
| 23 | 6 | 50.5 | 109.1 | 300 | 175 | 88 | 76 | 142 | 75 | 41.0 | 171 |
| 24 | 6 | 48.8 | 109.1 | 300 | 175 | 87 | 79 | 138 | 60 | — | 169 |
| 25 | 6 | 48.8 | 109.1 | 300 | 175 | 87 | 79 | 138 | 75 | — | 167 |
| 26 | 6 | 48.8 | 109.1 | 300 | 175 | 90 | 79 | 138 | 70 | — | 167 |
| 27 | 8 | 48.8 | 109.1 | 300 | 175 | 92 | 83 | 132 | 48 | — | 167 |
| 28 | 6 | 109.1 | 109.1 | 300 | 175 | 90 | 81 | 135 | 45 | 48.0 | 160 |
| 29 | 6 | 109.1 | 109.1 | 300 | 175 | 315 | 310 | 215 | 40 | 47.0 | 183 |
| 30 | 6 | 109.1 | — | 300 | 175 | 320 | 311 | 310 | 75 | 41.0 | 230 |
| 31 | 6 | 109.1 | — | 300 | 175 | 160 | 125 | 150 | 50 | 40.6 | 158 |
| 32 | 6 | — | — | — | — | — | — | — | — | — | — |
| 33 | 9 | 52.5 | 109.1 | 300 | 185 | 82 | 107 | 134 | 27 | 42.6 | 129 |
| 34 | 7 | 52.5 | 109.1 | 300 | 185 | 94 | 106 | 119 | 28 | — | 160 |
| 35 | 12 | 52.5 | 109.1 | 300 | 190 | 96 | 108 | 126 | 30 | — | 160 |
| 36 | 10 | 109.1 | 109.1 | 300 | 140 | 68 | 81 | 134 | 55 | 50.0 | 140 |
| 37 | 10 | 109.1 | 109.1 | 300 | 150 | 68 | 83 | 135 | 55 | 54.0 | 133 |
| 38 | 11 | 48.8 | 48.8 | 300 | 150 | 108 | 141 | 111 | 9 | 31.0 | 178 |
| [6]39 | 13 | 91.1 | — | — | 181 | — | — | — | — | 43.0 | — |
| [6]40 | 14 | 91.1 | — | — | 181 | — | — | — | — | 41.0 | — |
| 41 | 5 | 109.1 | 109.1 | 300 | 175 | 85 | 88 | 134 | 10 | — | — |
| 42 | 15 | 32.2 | — | — | 190 | — | — | — | — | 24.0 | — |
| 43 | 15 | 32.2 | — | — | 195 | — | — | — | — | 24.0 | — |

TABLE II-continued

| | | | | | First Extruder | | | | | |
|---|---|---|---|---|---|---|---|---|---|---|
| Run No. | [1]Mix No. | [2]Water Addition M.C. | [3]Water Addition Extruder | Screw Speed (rpm) | Mixing Cyl. | [4]Temperatures-° F. Head 5 | Head 6 | Head 7 | Extrusion Pressure (psig) | [5]Product Moisture Level | Product Temp ° F. |
| 44 | 15 | 32.2 | — | — | 185 | — | — | — | — | 24.0 | — |

[1] Mix Numbers correspond to those of Table I.
[2] Water addition to mixing cylinder of first extruder in lbs./hr. (approx.).
[3] Water addition to first extruder barrel in lbs./hr. (approx.).
[4] Temperatures derived from thermocouple measurements.
[5] Data given in percent by weight and is taken on product from first extruder, save for Runs 39-40 and 42-44 when moisture reading taken on product from batch mixer.
[6] In Runs Nos. 39-40 and 42-44 the mix was not extruded in a first extruder but rather processed in a high speed mixer and passed directly to the second extruder.

The water figures were taken directly from gauge instrumentation on the extruder and represent approximations only. Similarly, the temperatures in the mixing cylinder and extruder heads are thermocouple measured and cannot be considered as exact. The "product" temperature and moisture levels noted in Table II refer to the hot, flowable product from the first extruder.

In a similar manner, data was collected from the second extruder during operation thereof, and this data is collected in Table III:

TABLE III

| | | | Second Extruder | | | | | | |
|---|---|---|---|---|---|---|---|---|---|
| Run No. | [1]Mix No. | [2]Water Addition Extruder | Screw Speed (rpm) | [3]Temperatures-F° Head 7 | Head 8 | Head 9 | Head 10 | Extrusion Pressure (psig) | [4]Analogue Product Moisture Level | [5]Analogue Product Density |
| 1 | 1 | 64.8 | 250 | 284 | 285 | 246 | 120 | — | 34.0 | 30.0 |
| 2 | 1 | 93.6 | 250 | 301 | 290 | 260 | 119 | — | 33.0 | 30.5 |
| 3 | 1 | 111.6 | 250 | 300 | 287 | 260 | 117 | — | 32.5 | 29.75 |
| 4 | 1 | 135.5 | 250 | 298 | 290 | 252 | 115 | — | 37.8 | 30.2 |
| 5 | 1 | 64.8 | 250 | 301 | 292 | 259 | 120 | — | 33.0 | 30.0 |
| 6 | 2 | 64.8 | 250 | 289 | 289 | 256 | 119 | 30–35 | 40.0 | 32.5 |
| 7 | 2 | 28.4 | 250 | 301 | 295 | 256 | 120 | 25–35 | 36.5 | 30.75 |
| 8 | 2 | None | 250 | 304 | 291 | 255 | 121 | 30–38 | 33.0 | 34.25 |
| 9 | 2 | None | 250 | 306 | 295 | 260 | 124 | 35–45 | 30.0 | 33.0 |
| 10 | 3 | 39.4 | 250 | 298 | 291 | 256 | 119 | 20–25 | 40.0 | 32.5 |
| 11 | 3 | None | 250 | 301 | 293 | 254 | 120 | 25–30 | 33.5 | 32.75 |
| 12 | 3 | 70.6 | 250 | 295 | 290 | 233 | 126 | 20–30 | 42.0 | — |
| 13 | 3 | 35.8 | 250 | 296 | 291 | 235 | 115 | 30 | — | 32.0 |
| 14 | 4 | 33.8 | 250 | 290 | 285 | 230 | 119 | 30 | 39.0 | 32.0 |
| 15 | 4 | 49.2 | 300 | 298 | 292 | 224 | 117 | 30 | 38.0 | 38.75 |
| 16 | 4 | — | 300 | 304 | 290 | 230 | 220 | 40–42.5 | 38.4 | 31.75 |
| 17 | 5 | 15.1 | 250 | 301 | 286 | 233 | 130 | 28–30 | 41.0 | 33.5 |
| 18 | 5B | 15.1 | 250 | 308 | 291 | 229 | 116 | 32.5 | 35.0 | 33.5 |
| 19 | 5A | 15.1 | 250 | 310 | 291 | 240 | 119 | 45.0 | 35.0 | 29.5 |
| 20 | 5A | 91.9 | 250 | 310 | 285 | 245 | 145 | 40.0 | — | — |
| 21 | 6 | 21.2 | 250 | 299 | 282 | 265 | 115 | 40–42 | 44.0 | 33.25 |
| 22 | 6 | none | 250 | 306 | 289 | 264 | 124 | 55–60 | 34.0 | 32.0 |
| 23 | 6 | 57.5 | 250 | 306 | 280 | 264 | 118 | 55.0 | 42.5 | 35.5 |
| 24 | 6 | 21.2 | 250 | 311 | 291 | 280 | 250 | 60.0 | — | 33.0 |
| 25 | 6 | 21.2 | 300 | 308 | 285 | 264 | 121 | 30–35 | 38.2 | 28.5 |
| 26 | 6 | 21.2 | 200 | 310 | 286 | 270 | 115 | 30–40 | 40.0 | — |
| 27 | 8 | 21.2 | 250 | 306 | 285 | 261 | 114 | 25–30 | 42.4 | 34.0 |
| 28 | 6 | — | 250 | 306 | 286 | 262 | 113 | 25–30 | — | — |
| 29 | 6 | — | 250 | 301 | 289 | 265 | 116 | 25–30 | — | 30.75 |
| 30 | 6 | 43.3 | 250 | 304 | 288 | 263 | 118 | 25.0 | 39.8 | 36.5 |
| 31 | 6 | 43.3 | 250 | 310 | 289 | 265 | 117 | 27.5 | 40.0 | 33.5 |
| 32 | 6 | — | 250 | 307 | 286 | 258 | 114 | 25.0 | — | — |
| 33 | 9 | — | 250 | 296 | 284 | 249 | 132 | 15–20 | 47.0 | 38 |
| 34 | 7 | 17.7 | 250 | 304 | 284 | 255 | 112 | 10–20 | 41.8 | 35.5 |
| 35 | 12 | — | 250 | 302 | 283 | 257 | 116 | 5–20 | 43.5 | 34.5 |
| 36 | 10 | 20.5 | 250 | 305 | 285 | 265 | 125 | 25–30 | 45.5 | 32.0 |
| 37 | 10 | 28.4 | 250 | 260 | 105 | 135 | 126 | 55–60 | 54.0 | — |
| 38 | 11 | 22.2 | 250 | 291 | 273 | 120 | 111 | — | 34.4 | 32.5 |
| 39 | 13 | 99.7 | 250 | 285 | 190 | 150 | — | 55–60 | 46.0 | — |
| 40 | 14 | 91.1 | 250 | 265 | 238 | 245 | — | 50–55 | 47.0 | — |
| 41 | 5 | 28.4 | 250 | 300 | 280 | 125 | 126 | 30–40 | — | — |
| 42 | 15 | 50.5 | 250–300 | 311 | 308 | 309 | 125 | — | 37.5 | 29.5 |
| 43 | 15 | 74.7 | 300 | 312 | 316 | 295 | 115 | — | 34.0 | 28.0 |
| 44 | 15 | 22.2 | 300 | 315 | 310 | 245 | 260 | — | 29.5 | 26.0 |

[1] Mix Nos. correspond to those of Table I.
[2] Water addition to extruder barrel in lbs./hr. (approx.).
[3] Temperatures derived from thermocouple measurements.
[4] Data given in percent by weight.
[5] Density data given in lbs./cu.ft. and taken before product dried.

In the above Table the "analogue products" referred to are the layered, untwisted meat analogues hereof.

The above runs all produced meat analogues which were to a greater or lesser degree dense, layered, untwisted products closely similar to real meat in terms of mouth-feel and texture. The following discussion is intended to illustrate the operational differences in the respective product runs as well as to discuss the salient characteristics of the final products.

Runs 1–5 all employed mix No. 1 of Table I wherein the amount of moisture added to the admixture was varied. In other respects these processing runs were closely similar. In particular, Runs 1–5 all used identical screw speeds in the first and second extruders and closely similar temperatures and extrusion pressures in the heads of the respective extruders. However, in Runs 1–4 the amount of moisture added in the second extruder barrel was progressively increased, with the amount of water added in extruder 2 in Run No. 5 being equal to that of Run No. 1. The temperatures maintained in the second extruder in Runs 2–5 were also increased somewhat relative to Run No. 1. The moisture added in the first extruder and mixing cylinder was identical in all of these runs. The products derived from Run Nos. 1, 4 and 5 were retorted for 110 minutes at 15 p.s.i.g. in bouillon to which smoke flavor was added (2 teaspoons per pint of water). The product remained stable and had excellent textural characteristics and as uniformly layered, untwisted structure.

Runs Nos. 2–4 were processed with increasing moisture relative to Run No. 1 and the resultant products had very good appearance and textural properties, particularly Run No. 3. Run No. 5 likewise exhibited good eye appeal but had a slight grainy texture. Retorting of this product for 110 minutes at 15 p.s.i.g. seemed to remove substantially all traces of granularity however.

Runs 6–9 were processed with Mix No. 2 and again the extruder conditions were held as uniform as possible save for water addition to the second extruder, which was varied in the runs. All of these products were likewise acceptable but a certain amount of granularity was detected in the high moisture runs. As can be seen from a study of Table III, this series of runs gave high density products, and these products were in general more chewy than those produced in the first series of runs. The sodium metabisulfite additive was felt to act as a surfactant and prevent so-called "blowing" or intermittent, sporadic discharge at the second extruder during processing.

Runs 10–13 were made using mix No. 3 wherein sodium bisulfite was employed. If was found that this additive likewise was beneficial in the product in terms of the final appearance and textural characteristics. Nevertheless, these products blew from time-to-time but when running uniformly the final product had thin, uniform layers and good textural characteristics. These products were rehydrated for about seven minutes in boiling water to an estimated 70% by weight water without losing their uniformly layered, meat-like appearance. The product from Run No. 12 was also dried to a level of about 8% moisture and fried in cooking oil, and this product took on a texture and mouth-feel of very well-done steak. In addition, a sample of the dried product was rehydrated in boiling water to an estimated level of 65–70% by weight moisture, whereupon the product was fried. This cooked analogue had a toughened surface and a soft center.

Run 14 was prepared using mix No. 4, which is similar to mix 3 save for the addition of extra sodium bisulfite. The product had a relatively high density, even, spreadable layers and a mouth-feel closely approximating real meat. Run No. 14 was subjected to the following treatment:

1. Undried chunks of the product were collected as extruded from the second extruder and cooked in a small amount of corn oil. This product had a chewy texture similar to steak and was fully acceptable as a meat substitute.

2. The chunked product was dried to a moisture level of about 8% by weight. Thereafter, it was rehydrated in boiling water for 5 minutes and tested for mouth-feel and meat-like structure. In all respects the rehydrated product was superior to conventional meat analogues. A portion of the rehydrated product was also fried in oil at low temperature and had a look and taste approximating fried ham.

3. The dried chunked product was rehydrated in boiling water for 15 minutes. The chunks retained their meat-like appearance and structure and was very moist and soft to taste.

4. The 15 minute rehydrated product was french fried in oil. This product apparently took up a relatively large amount of oil and became somewhat greasy tasting. However, it was clear that the product could be successfully french fried if the moisture level thereof was kept lower.

Run No. 15 was one of the densest products made (Mix No. 4 used). Complete rehydration took 30 minutes in boiling water and the product was not as pleasing in terms of mouth-feel and texture as other runs in this test, even though in appearance to the eye the analogue looked very much like real meat.

Run No. 16 (Mix No. 4) yielded a relatively high moisture, dense product which was excellent in all respects. In this case the temperatures and extrusion pressures in the second extruder were higher than with Run 15, which demonstrated that these parameters could be varied without deleteriously affecting the final products. The Run 16 analogue was rehydrated for 5 minutes in boiling water and thereafter fried in oil for a total of 10 minutes to give a final cooked product which had separable, even, generally rectilinear, untwisted layers.

Runs 17–20 were carried out using mixes numbers 5, 5B and 5A in order to determine the effect of pH modification on the products hereof. Mix No. 5 had no pH modification at all (pH 6.4) while mix 5A was modified with concentrated hydrochloric acid to pH of about 5.5, and mix 5B had an alkaline modification using 0.8% sodium hydroxide to a pH of about 7.1. Run 17 using the unmodified mix No. 5 extruded well and yielded a product having a density of about 33.5 pounds per cubic foot as extruded and prior to drying. After rehydration five minutes in boiling water, the product exhibited superior mouth-feel and appearance characteristics and could be separated by hand into very thin, even layers. When fried for 5 minutes the mouth-feel and textural qualities were very similar to cooked ham.

Run 18 made with mix No. 5B and this extruded very uniformly without blowing or surging and yielded end products having an excellent ham-like appearance. The product also had a slight marbling which was maintained even after rehydration in boiling water for 30 minutes. Subsequent to rehydration the product was fried in light oil in a skillet, after which the product was excellent in terms of mouth feel and appearance.

Runs 19–20 were made with acid modified mix 5A. The density of the run 19 product was only about 30 pounds per cubic foot on a wet basis and had a very well defined layered, untwisted structure. When rehydrated in boiling water for 15 minutes and fried for 5 minutes on each side, the product had pleasant mouth feel and texture and was chewier than the alkaline product. During extrusion, this product tended to surge and blow occasionally but when running smoothly the product was excellent in all respects.

Runs 21–26 and 28–32 were all made from defatted soy flour (mix No. 6) and moisture without any additives. The objective of these runs was to determine if a dense, evenly layered, untwisted meat-like structure could be made from a vegetable protein source such as defatted soy flour alone. Run 21 had a normal moisture level, weighed about 33 pounds per cubic foot wet and rehydrated well, exhibiting a good sheeted laminar structure which fried well to a pleasantly chewy, meat-like product.

Run No. 22 was designed to test processing conditions on defatted soy flour with a low moisture content. This product weighed approximately 32 pounds per cubic foot wet and was in all other respects identical to Run No. 21. The organoleptic properties of this product were also superior.

Run No. 23 was designed to test the production of meat analogue products using higher levels of moisture. This product weighed about 35.5 pounds per cubic foot wet and while acceptable as a full meat substitute it did not have the excellent layering and mouth feel of the products of Run No. 22.

Run 24 was designed to test the production of the analogues hereof using defatted soy flour without other additives and at relatively high temperatures in the tenth head of the extruder. In this case, steam (as opposed to cold water) was circulated in the jacket of the tenth head. In addition, the pressures in the tenth head were also higher than in other tests, about 60 p.s.i.g. This product was inferior in some respects to those discussed above. This test indicated that the combination of relatively high temperatures and extruder pressures should be avoided in the processing of the best quality meat analogues hereof.

Run 25 was run at normal moisture content with all conditions identical with those of Run 24 except that water was introduced to the jacket around the tenth head of the extruder as opposed to steam. This had the effect of lowering the temperature and extrusion pressure in the second extruder which in turn resulted in the production of a layered, untwisted product. This product was rehydrated for ten minutes in boiling water and exhibited no undesirable sponginess. Subsequent frying of the product rendered it tougher and gave it a taste and appearance closely similar to ham.

Run 26 was identical in most respects to Run 25 except that the screw speed on the second extruder was lowered to 200 r.p.m. At this screw speed the run became somewhat unstable leading to the conclusion that with the size of equipment used the 200 r.p.m. figure was the practical minimum for a straight defatted soy flour run. As set forth above however, with larger machines or different mix formulations the optimum screw speed should be subject to change.

Run No. 27 was made with mix No. 8 which consisted of defatted soy flour plus 0.50% by weight lecithin. The objective of this run was to determine if the addition of lecithin would produce a product superior to other similar runs in which no lecithin was used. The product had an undried density of 34 pounds per cubic foot and laminated with sheets of moderate thickness. The product rehydrated satisfactorily in 15 minutes in boiling water and was thereafter skillet fried in oil to produce a very tender bite-sized chunk, not unlike medium-rare steak.

Run No. 28 (Mix No. 6) was designed to test the effects of using a high moisture content in the first extruder and a low moisture content in the second extruder. The product produced in this run surged somewhat in the second extruder under these conditions but was stable for the majority of the run without blowing. The laminar structure of the double extruded product was quite acceptable, although the layers were somewhat thicker than those of other runs. No moisture was added to the second extruder and this appeared to produce a chewier product than similar runs in which moisture was added. Therefore, it appears that where more chewier products are desired, the requisite moisture could be added entirely in the first extruder with little if any added in the second extruder.

Run No. 29 (Mix No. 6) was designed to test the production of the products hereof with high moisture and temperature levels in the first extruder and lower moisture and temperature levels in the second extruder. This produced a stable run and a product exhibiting even, untwisted, rectilinear laminations. The dried product rehydrated well in 15 minutes in boiling water and gave a meat-like product upon frying in oil.

Run No. 30 (Mix No. 6) was made to determine the quality of the product using low moisture and high temperature levels in the first extruder and lower levels of moisture and temperature in the second extruder. Examination of the product from the first extruder showed that it was approaching texturization, but that this material could not be said to be completely oriented. The product out of the second extruder exhibited lesser degrees of desirable layering showed in certain instances a somewhat twisted structure. This product also exhibited a granular texture upon taste tests. Therefore, it was retorted in a manner identical to Run No. 4 (110 minutes at 15 p.s.i.g., 250° F.) and the retorted product was found to lose its granularity and be pleasantly chewy.

Run No. 31 (Mix No. 6) was processed to determine whether the moisture level could be kept low and temperatures low in the No. 1 extruder, with most of the moisture being added in the second extruder and somewhat higher temperatures being maintained therein. This run was stable and produced a product which had a density of about 33.5 pounds per cubic foot. The analogue had a chewy texture which closely resembled real meat.

Run No. 33 (Mix No. 9) was run to determine whether DL methionine could be added prior to extrusion to a formula containing defatted soy flour, Red No. 40 coloring, sodium bisulfite and lecithin in levels previously tested. This product ran well with 1,250 parts per million of DL methionine and had a dry density (about 8% moisture) of about 31.5 pounds per cubic foot. The resultant analogue exhibited excellent layering and textural characteristics quite similar to the mouth feel of baked white meat of chicken. When the product was rehydrated and fried in oil a chewy, tight-knit end texture was evident.

Run No. 34 was run designed to determine whether full fat soy could be successfully used in the mixtures of the present invention. The analogue products resulting from this run were very acceptable in every way as full meat substitutes.

Run No. 35 (Mix No. 12). This run was designed to test the effect on flavor of using DL methionine as an additive to defatted soy flour analogues. The resultant product exhibited no astringent flavor and was very acceptable from a taste and organoleptic standpoint (as was Run 33). These mixtures produced generally chewier products than similar products free of DL mentionine, leading to the conclusion that this additive is beneficial when added chewiness is desired. The texture of Run No. 35, after rehydration in boiling water, was quite similar to that of boiled shrimp.

Run No. 36 (Mix No. 10) was run with 100% defatted soy concentrate flour which was approximately 70% by weight protein. This test was designed to determine whether soy concentrate could be used as well as defatted soy flour. Since the soy concentrate has a low nitrogen solubility index, maximum moisture was used in the first extruder so that the flour would have sufficient time to take up the needed moisture. Maximum temperature used in the second extruder was about 305° F. in the seventh head and pressures were somewhat higher than used generally, i.e., 55 p.s.i.g. This run produced a very desirable meat analogue product with uniform, untwisted layers. The product was also reconstituted in boiling water the color and texture closely resembled the white meat of turkey and was chewy to taste. In addition, frying in oil for 5 minutes on each side yielded a veal-like meat product.

Run 37 (Mix No. 10) was designed to determine the maximum moisture content practical when using defatted soy concentrate in which most of the moisture was added in the first extruder and at minimum temperature. The second extruder barrel was also maintained at relatively low temperatures throughout the length thereof since the soy concentrate is denatured and has a low NSI. The extrudate from the second extruder had a very high moisture content (54.0%) which resulted in a somewhat twisted, spongy and uneven appearance. In addition, the high extrusion pressure of from 55 to 60 p.s.i.g. is believed to have deleteriously affected the quality of this product.

Run No. 38 (Mix No. 11) was run to determine whether peanut flour (Gold Kist defatted peanut flour, 63% protein) and moisture without any other additives could make a satisfactory meat analogue product. No additives were used in this admixture. The extrusion process was not as regular as with defatted soy flour and some blowing was initially experienced until temperature and pressure conditions were adjusted to proper levels for this particular admixture. The resultant product had good, uniform meat-like layers and reconstituted well with boiling water but took a full 15 minutes to rehydrate. When fried for 5 minutes on each side in a lightly oiled skillet had a texture and mouth feel like fried steak.

Runs Nos. 39 and 40 were both made by premoistening the dry material (Mixes Nos. 13 and 14 respectively) in a batch mixture with 13.8% water being sprayed on in the mixer which was thereafter left running for 15-20 minutes. The objective of these runs was to determine the effect of bypassing the first extruder and premixing in other types of equipment. In particular, the protein-moisture admixture from the batch mixer was first directed to the high-speed mixing cylinder of the first extruder where it was thoroughly admixed with steam whereupon the heated and moistened admixture was passed directly to the barrel of the second extruder, thus bypassing the first extruder barrel completely.

Run No. 39 (Mix 13) employed defatted soy concentrates and produced a layered product which would be acceptable as a meat substitute. In addition, the stability of the run was adequate with only minor surging and blowing being experienced. In the case of Run No. 40, a good deal of layering was observed in the final product but a minor amount of twisting of the layers was also noticed. In any event, it is clear that while the double extrusion process is preferred, acceptable products can be made using batch-mixing and premoistening techniques in the first step. In this regard it is believed necessary only to process the protein-moisture admixture to render the same hot, flowable and substantially unoriented and untexturized. Such alternative processing techniques may employ steam at atmospheric pressures or above as an acceptable method of eliminating the first of the two extruders.

Run No. 41 (Mix No. 5) was made using both extruders as shown in FIGS. 1-2 but with a specialized, circumferentially orificed die. This die had a series of 36 1 × ¼ inches slots equidistantly spaced about the circumferential surface of the die such that the admixture was extruded radially outwardly from the extension. This Run surged initially from the second extruder but thereafter smoothed out. The resultant product, while clearly superior to prior art analogues, was somewhat inferior to most of the products made in Runs 1-40 in that the uniformity and layering of this product was not as good, and some twisting of the product occurred. However, the run did demonstrate that while a variety of dies could be used in the invention, but that axial extrusion from the extruder extension was preferred.

In Runs 42-44 (Mix 15) soybean meal was used as the premoistened vegetable protein source and the analogue was processed in a single extruder in a manner similar to that discussed in connection with Runs 39-40. In particular, 200 lbs. of dry mixture 15 was placed in a batch mixture whereupon 42 lbs. of water was admixed therewith until an amorphous flowable mass was produced. At this point the admixture was directed to a high speed mixer of the type illustrated in FIGS. 1-2, and the admixture was mixed with steam and passed to the barrel of an extruder of the type illustrated at 12 in the drawings. The resultant products from these runs yielded attractive, layered analogues exhibiting an untwisted, laminate structure but in general the mouth feel of the analogues was not as good as those which were double-extruded.

Figure 4:
FIG. 4 is a photograph at approximately 9.5 magnifications of a rehydrated and cooked meat analogue product of the present invention.

As an illustration of the products produced in accordance with the invention, attention is directed to FIGS. 4-23. First of all, FIG. 4 illustrates a greatly magnified (9.5×) photograph of a chunk of the meat analogue product produced in accordance with the invention. In this case, the analogue product is a sample taken from Run No. 4 discussed above which has been retorted for 110 minutes at 15 p.s.i.g. A study of the photograph will illustrate the layered, untwisted, meat-like structure. In addition, it will be noted that the layers are untwisted relative to each other and are manually separable, similar to cutting along the grain of a chunk of meat such as ham or beef steak.

Figure 5:
FIG. 5 is a photograph at approximately 5 magnifications depicting a side-by-side comparison of chunks of ham and a ham analogue hereof.

FIG. 5 illustrates a comparison between chunks of cooked ham and a red colored ham-like analogue of the present invention. In particular, two chunks of the analogue product are depicted top two chunks, with these chunks being taken from Run No. 3 discussed above, and rehydrated from 15 minutes in boiling water. On the other hand, the bottom two chunks are taken from a commercially available, fully cooked, cured ham. The layers of both products were lightly and similarly separated with a fork for purposes of structural comparison. A perusal of the respective appearances of the ham and meat analogue will illustrate the dramatic similarity therebetween. In fact, it is almost impossible to distinguish between the natural ham and the analogue products of the invention.

Figure 6:
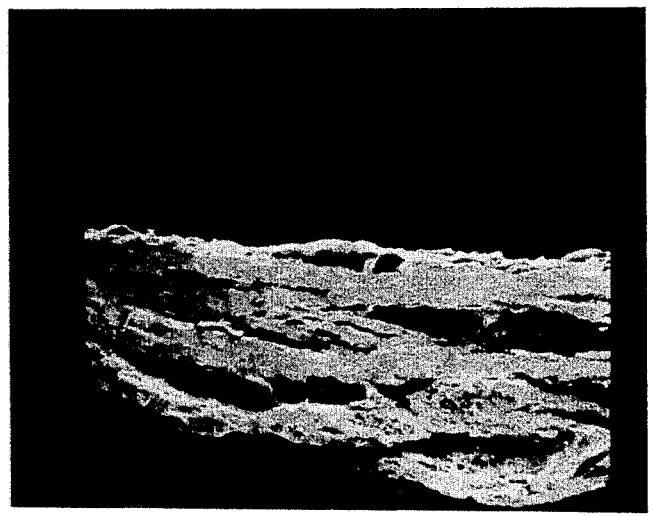
FIGS. 6–8 are electron scan microphotographs of a typical meat analogue product in accordance with the invention, taken at 19.5, 39, and 139 magnifications respectively.
Figure 7:
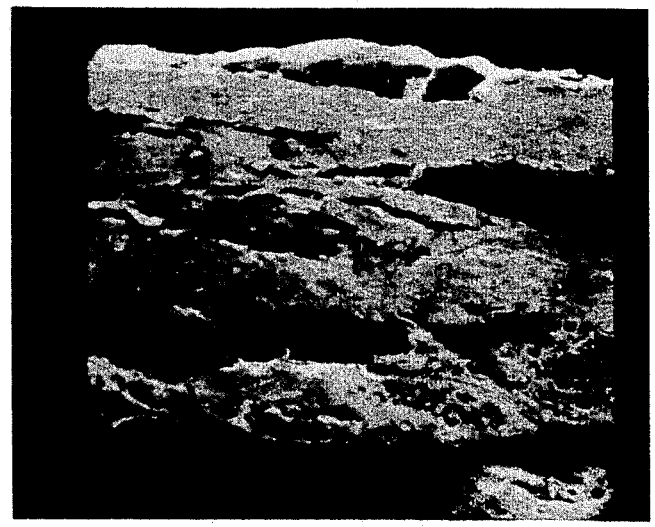
Figure 8:
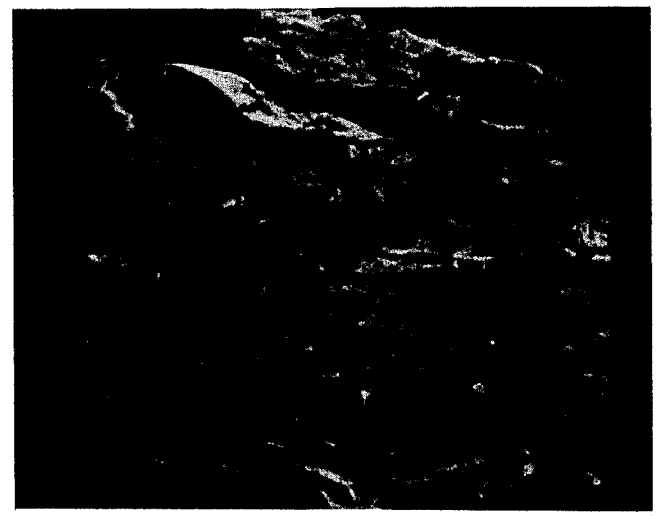
Figure 9:
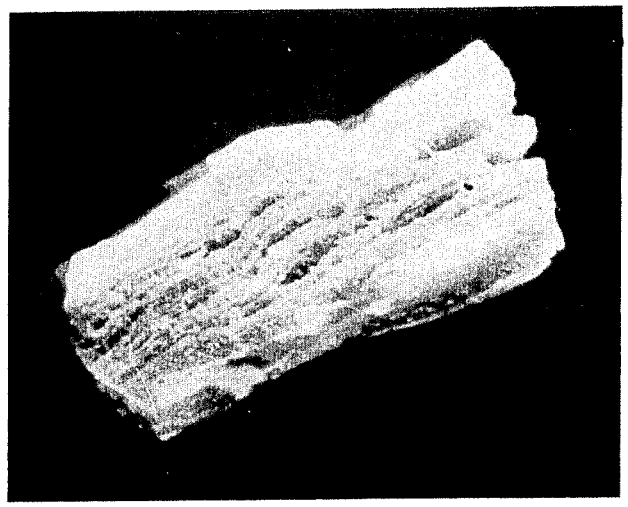
FIGS. 9–11 are enlarged (about 3.35×) sequential photographs of a single piece of vegetable protein based meat analogue in accordance with the invention, with FIG. 9 illustrating the analogue in dried form, FIG. 10 in hydrated form, and FIG. 11 showing the meat-like layers thereof after manual separation.
Figure 10:
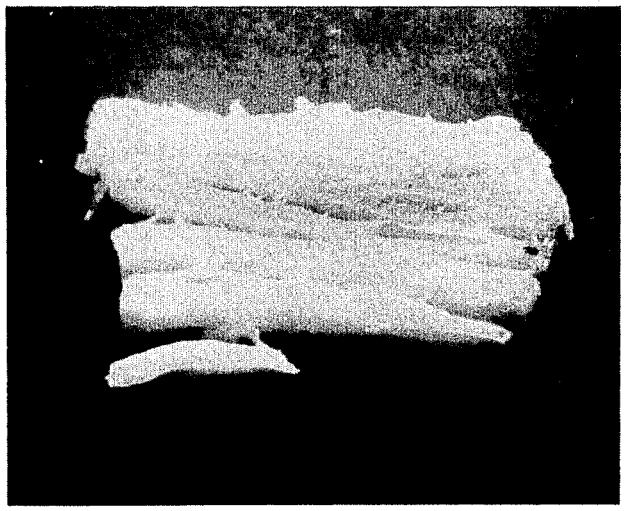
Figure 11:
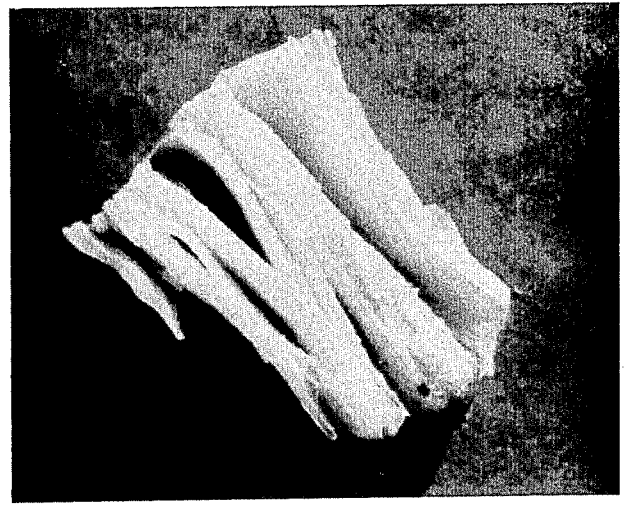
Figure 12:
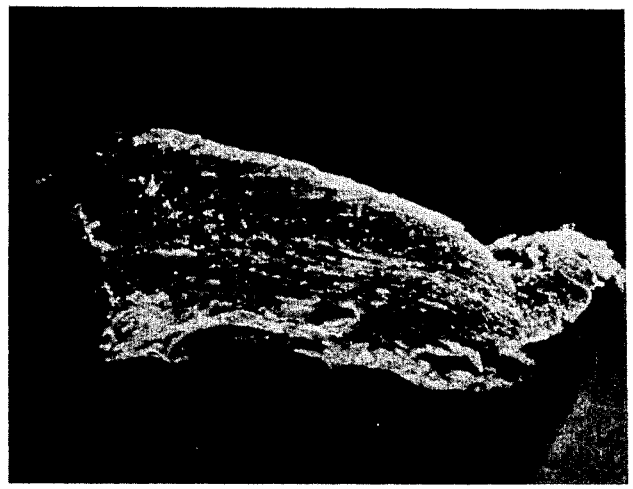
FIGS. 12–14 are enlarged (about 3.35×) sequential photographs of another piece of meat analogue product respectively showing the same in dried form, hydrated and with the layers thereof manually separated.
Figure 13:
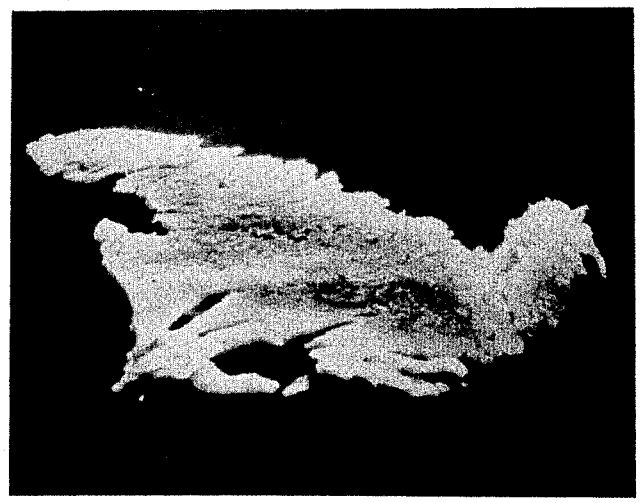
Figure 14:
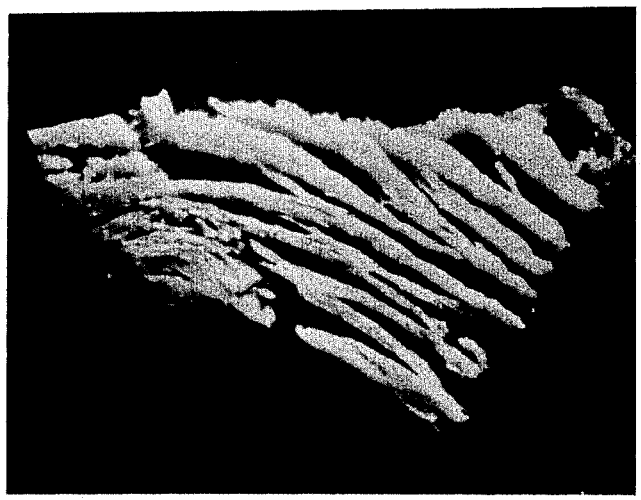

FIGS. 6-8 are electron scan microphotographs at increasing magnifications of a single piece of ham-like analogue taken from Run No. 3. These photographs were taken along a razor cut section which was cut perpendicularly to the direction of extrusion. A study of the sectional photographs will demonstrate the layering and denseness of the products hereof which serves to give the same their specific meat-like appearance, texture and mouth-feel.

FIGS. 9-11 and 12-14 each depict a single piece of product taken from Runs 25 and 3 respectively which have been photographed in dried form, after rehydration in boiling water, and after manual separation of the layers thereof. These two series of photographs again dramatically illustrate the meat-like structure of the present products.

Figure 15:
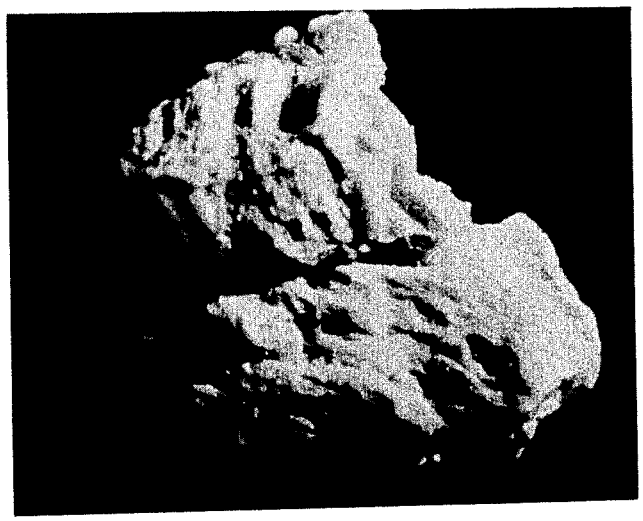
FIGS. 15–17 are a series of enlarged (about 3.35×) sequential photographs respectively depicting a typical prior art extrusion processed, expanded vegetable protein meat extender product as it would appear in dried form, when hydrated and after attempted separation of the twisted layers thereof.
Figure 16:
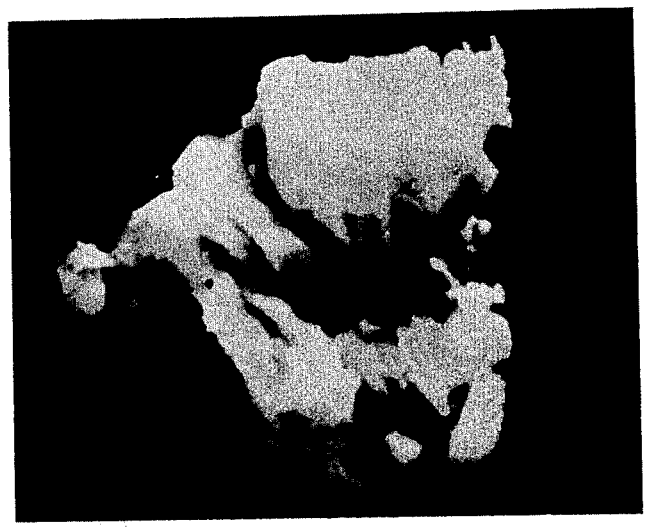
Figure 17:
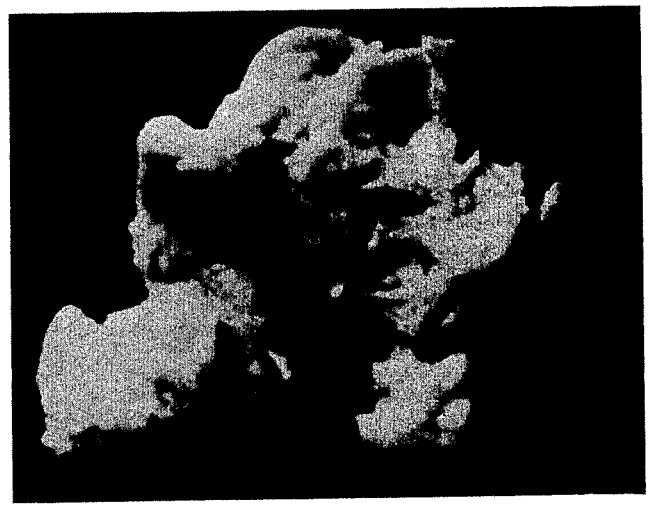

As a comparison to the foregoing, attention is directed to the prior art meat extender showings of FIGS. 15-17. In this case, a typical expanded, twisted vegetable protein meat extender product is depicted in dried form, after rehydration in boiling water and after attempted manual separation of the twisted structure thereof. This type of product is common in prior art processes and is generally produced in a single extruder at high temperatures and pressures, i.e., about 250-900 p.s.i.g. The particular prior art product depicted was produced from an admixture comprising only defatted soy flour and moisture just as was the case with the samples illustrated in FIGS. 9-11. A comparison of the prior art meat extender product with those of the present invention will confirm the striking differences in the present products. In particular, the prior art is characterized by very little if any layering, and moreover, any laminations which do appear are of irregular length and are in random orientation and are twisted relative to each other. This produces a resilient, spongy texture and mouth feel in the prior art product which generally limits its usage in other randomly oriented meat products such as hamburger or bacon bits, and makes it unsuitable as a full meat analogue.

Figure 18:
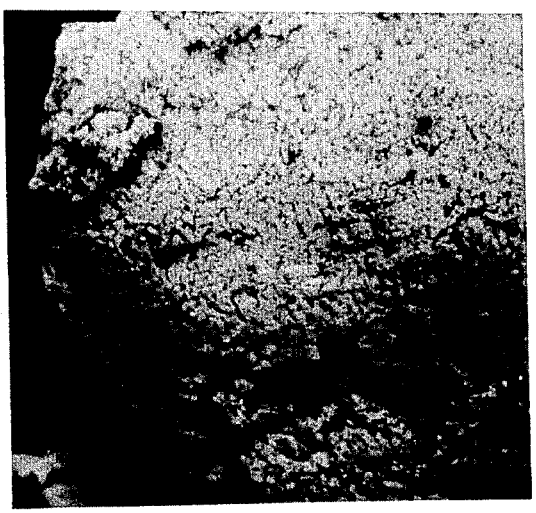
FIG. 18 is an electron scan microphotograph taken at 19.5 magnifications of the unoriented admixture emerging from the first extruder in the process of the present invention.

FIG. 18 is a photograph illustrating the type of product which emerges from the first extruder in the preferred process of the present invention. As will be seen, this product has no layering or substantial texturization, but rather is simply an unoriented but thoroughly admixed, flowable, heated amorphous mass. As set forth above, in the preferred process of the present invention the product depicted in FIG. 18 is produced by passing a vegetable protein-moisture admixture through a first extruder. However, it has also been found that other premoistening and preheating methods can be employed to achieve the purpose of rendering the admixture hot and flowable, but unoriented. Such alternatives include premoistening in a batch mixer or continuous mixer plus heating moistened process materials at atmospheric pressures or at pressures higher than atmospheric pressure. The particular product depicted in FIG. 18 is that which was obtained upon emergence from the first extruder during the processing of Run No. 11.

Figure 19:
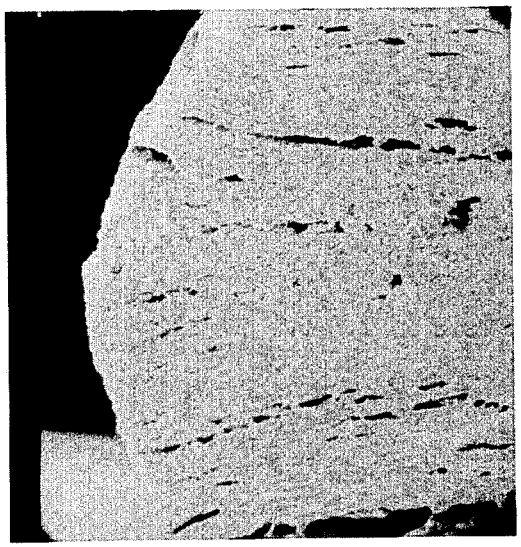
FIG. 19 is an electron scan microphotograph taken at 14.7 magnifications and illustrating a side view of a meat analogue product in accordance with the invention.

FIG. 19 illustrates a side view of a dried, unhydrated chunk sample taken from Run No. 30. This side view demonstrates the dense, layered nature of the products hereof and also indicates that the central layers extruded through the die openings of the second extruder, travel at a somewhat greater velocity than layers immediately adjacent the defining walls of the die openings. This is evidenced by the outwardly projecting "bulge" in the chunk.

Figure 20:
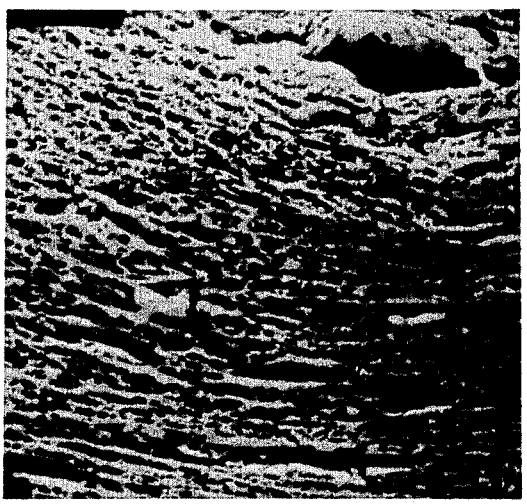
FIG. 20 is an electron scan microphotograph taken at 19.5 magnifications and illustrating the uniformly layered, untwisted nature of the products hereof.

FIG. 20 is an electron scan microphotograph of the surface of an analogue chunk which has been cut by the rotary knife as it emerges from the second extruder. This particular sample was taken from Run No. 20 and the photograph (at 19.5 magnifications) illustrates the layered, untwisted, relatively dense structure of the product.

Figure 21:
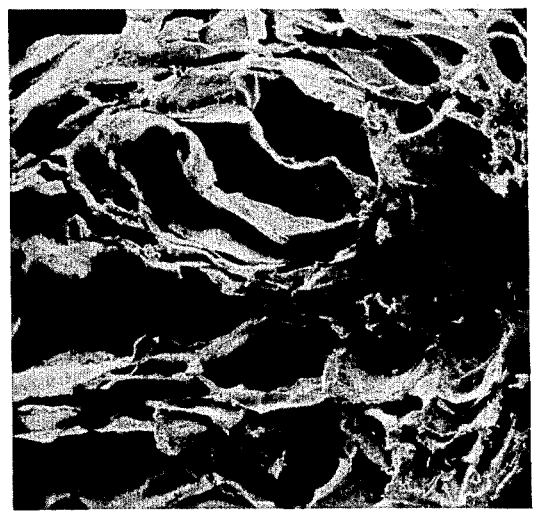
FIG. 21 is an electron scan microphotograph taken at 19.5 magnifications and illustrating the irregular structure of an unhydrated conventional extruded vegetable protein meat extender product of low density.
Figure 22:
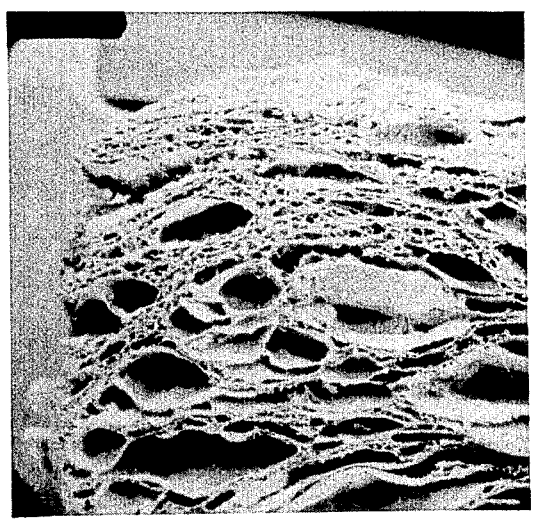
FIG. 22 is an electron scan microphotograph taken at 19.6 magnifications of an unhydrated conventional extrusion process vegetable protein meat extender product in dried form.
Figure 23:
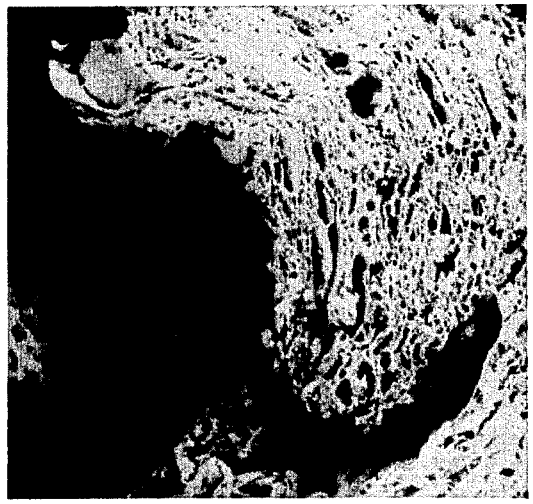
FIG. 23 is another electron scan microphotograph taken at 17.5 magnifications of a prior art extrusion processed meat extender product and illustrating the twisted, irregular structure thereof.

Turning now to FIGS. 21-23, a further comparative showing of typical prior art meat extender products is presented. The microphotographs of the prior art products are for the most part directly comparable with the showings of FIGS. 15-17. For example, the microphotograph of FIG. 21 showing a sectional view (at 19.5 magnifications) of an unhydrated sample of the conventional meat extender product, clearly shows the expanded, irregular cellular nature thereof. In conventional meat extender processing techniques, this structure is formed by high extrusion pressures and temperatures which results in substantial flash-off of steam from the product as it emerges from the extrusion cooker. The spongy, non-uniform randomly twisted structure of such prior art meat extenders makes them suitable for blending with hamburgers, but generally unacceptable as full meat replacments.

FIG. 22 on the other hand illustrates a side view of a conventional meat extender product sample which in unhydrated material. This photograph (19.5×) is to be contrasted with that of FIG. 19 which is likewise a side view (14.7×) of an unhydrated meat analogue product in accordance with the invention. In FIG. 22 the expanded, irregular, cellular nature of the conventional meat extender product is clearly illustrated with the minor amount of layering in the product being twisted and nonuniform.

Finally, FIG. 23 is another microphotograph illustrating the typical twisted, nonuniform nature of the conventional meat extender product. This showing is to be contrasted with the photograph of FIG. 20 in order to illustrate the striking differences between the prior products and those of the instant invention.

As can be appreciated, the precise mechanism for producing the meat analogue products of the invention is extremely difficult, if not impossible, to determine. Nevertheless, during the course of development work in connection with the invention, a theory of operation has been developed and the same is set forth hereunder for the sake of completeness. It is to be clearly understood however, that the invention is in no way limited to any particular operational description or theory, and that the discussion presented hereinafter is purely hypothetical based upon previous experimental work.

First of all, it has been determined that in the first step of the present invention it is only necessary to heat and agitate an admixture comprising a vegetable protein and moisture to render the same hot, flowable and substantially unoriented. This can be accomplished most easily by passing the admixture through a cooking extruder set at appropriate conditions of temperature, pressure and retention time. However, it has also been demonstrated that this premoistening function can also be carried out in a batch mixer and that sufficient heat and additional moisture and agitation can be supplied in a high speed mixer or like apparatus well-known in this art. Therefore, it is believed that the type of processing in the first step is immaterial as long as the admixture is treated as aforesaid.

In an attempt to determine the mechanism for the formation of meat-like layers in the products of the present invention, the second extruder 12 in FIGS. 1-2 was stopped under full load, i.e., with admixture retained throughout the length of the extruder barrel and in the extension. An example of the admixture taken from the extruder barrel and another taken from the extension showed that substantially no layering took place in the barrel itself and that the admixture at the entrance to the extension had only a slightly elongated, sheet-like structure along a plane substantially perpendicular to the main direction of flow. These sheets were relatively thick and of "short" but layered texture. In addition, the sheeting effect did not appear to the naked eye to occur at the cylindrical wall of the extension. However, the admixture moving along the main line of flow between the extruder barrel and peripherally arranged die openings gave evidence of the formation of elongated, thin tubes or layers substantially parallel to the longitudinal axis of the extension.

Based upon the foregoing observations, the following operational theory is advanced. First of all, it will be clear that in the second extruder barrel the protein-moisture admixtre is subjected to conditions of superatmospheric pressure, agitation and shear by virtue of the rotation of the helical auger. This rotation simultaneously displaces the admixture in an axial direction relative to the barrel and also transversely thereof (cross-channel flow) to provide adequate stretching and working of the vegetable protein in the admixture. It is believed that this action is essential for preparing the protein for ultimate orientation in the final product.

In any event, as the admixture continuously leaves the extruder barrel and passes into the elongated extension, only a pressure force acts on the admixture. This pressure force is derived from the axial component of displacement force imparted to the admixture by the auger within the extruder barrel. Thus, the displacement force on the admixture within the extension is primarily axial relative to the extruder barrel and extension. Of course, it is probable that this displacement force in the extension is not purely axial by virtue of three factors: (1) the admixture leaving the extruder barrel may have elastic properties and thus "remember" a portion of the cross-channel forces imparted thereto in the barrel; (2) geometry, structural and temperature effects within the extension; and (3) any cross-channel momentum in the admixture derived from the motion of the screw flights.

The primarily axial displacement of the admixture within the extension, along with the temperature and pressure conditions maintained within the same, are believed to set up tube-like "streamlines" leading to and through the peripherally disposed die openings. This effect can possibly be analogized to fluid flow patterns. That is, all fluids under flow are subjected to shear stresses since not every element of fluid across a confined area travels at the same velocity. In this case, the admixture at the wall of the die openings at any given instant would theoretically have no velocity, while the admixture in the center of the die openings would have maximum velocity. As a result, shearing forces may be set up between different cylindrical "stream tubes" of flow such that portions of the admixture within the extension travel at different velocities. This difference in relative velocities is believed to effectively shear protein-protein attraction forces between adjacent tubular "stream tubes" as the admixture advances along the length of the extension. Moreover, it is believed that such attraction forces cannot be easily reestablished because of the relatively low temperature conditions maintained within the extension. On the other hand, protein molecules traveling within a given tubular "stream tube" develop strong bonding forces therebetween so that the buildup of layers is promoted. Thus, it is theorized that while no substantial mixing occurs between adjacent layers of flow, the structural integrity of each of the layers is nevertheless enhanced. Furthermore, since the layers of admixture are relatively cool, it is probable that the proteins therein are stretched and oriented as they flow along the respective "stream tubes."

The tubular layers or on "stream tubes" of flowing material may also be described as concentric cylinders traveling at different velocites with their cylindrical axes coinciding with the center line of the spacer. The different velocities of the layers may originate from "boundary effects" at the walls of the spacer. The high viscosity of the thermoplastic mass together with its relatively low velocity could be responsible for laminar flow in the spacer, i.e., a type of flow wherein the fluid elements travel in layers with no mixing or movement of fluid from one layer to another.

Other features which are believed to be important for producing the unique products of the invention include the absence of any substantial restriction as the admixture passes from the extruder barrel into the elongated extension. That is, as the admixture moves from the forward tip of the auger toward the die openings, lack of any substantial restrictions (e.g., a die plate) at the entrance to the extension is believed to permit any cross-channel velocites within the admixture to become damped and cancel each other out. This of course is important for producing the layered products hereof wherein the layers are untwisted relative to each other. In addition, this theoretical effect would tend to emphasize the advantage of having an extension of length permitting dampening of the cross-channel forces within the admixture traveling therethrough.

Finally, the location of the die openings about the outer periphery of the flat die plate is believed to be most advantageous since with this configuration there is little disruption of the "stream tubes" during formation and travel thereof through the extension. Finally, provision of a bullet 72 as illustrated in FIG. 3 also is believed to facilitate layering of the products hereof. This stems from the fact that the moving "stream tubes" are prevented from moving toward the center of the extension but rather are diverted toward the peripheral openings in the die plate.

In any event, it will be clear from the photographs presented herewith that the method of the present invention is operable to produce layered, untwisted meat analogue products as depicted at 102 in FIG. 3 and in the accompanying photographs.

Having thus described the invention, what is claimed as new and desired to be secured by Letters Patent is:

1. Apparatus for producing a dense, layered meat analogue from an admixture including vegetable protein and water, said apparatus comprising:

means for heating and agitating said admixture for rendering the same hot, flowable and substantially unoriented including an elongated, generally tubular first barrel having a receiving end and a delivery end, with an elongated, axially rotatable screw positioned within the first barrel and operable to move said admixture therethrough;

an elongated, generally tubular second barrel having a receiving end and a delivery end, means adjacent said receiving end of said second barrel for receiving said admixture from the delivery end of said first barrel and delivering the same to the interior of said second barrel, said receiving and delivery means including structure defining an opening in communication with the interior of said second barrel, said opening-defining structure being in spaced relationship from the delivery end of said first barrel for passage of the admixture through the atmosphere between the first and second barrels for allowing undesirable flavor precursors and the like to leave the admixture;

an elongated, axially rotatable screw situated within said second barrel for moving said admixture through the latter in a direction toward the delivery end thereof while simultaneously subjecting the admixture to displacement forces which are generally transverse of the longitudinal axis of the second barrel;

a hollow, tubular section presenting an elongated processing area mounted on the delivery end of said second barrel in substantial longitudinal alignment therewith and in communication with the interior of the latter;

a die plate positioned over the end of said section remote from said second barrel and being provided with a plurality of circumferentially arranged die openings positioned about the periphery thereof; and flow directional means positioned within said section for directing the flow of said admixture toward the die openings of said die plate.

2. The apparatus of claim 1 wherein said flow directional means comprises a bullet-shaped member centrally secured to the inner face of said die plate between said die openings and presenting a generally cylindrical section adjacent the die plate and a tapered conical section extending in a direction away from the die plate.

3. The apparatus of claim 1 including means on said first and second barrels for selectively controlling the temperature of the admixture passsing therethrough.

4. The apparatus of claim 1 wherein said opening-defining structure comprises an open-top hopper situated in sapced relationship below the delivery end of the first barrel.

5. The apparatus of claim 1 wherein the diameter of said section is less than the diameter of the majority of said second barrel.

6. The apparatus of claim 1 wherein said apparatus also includes:
means for cutting the extrudate emerging from said die plate on said second barrel;
means for drying the extrudate after cutting thereof; and
means for conveying the cut extrudate from the delivery end of said second barrel to said drying means.

* * * * *